Nov. 11, 1969    L. H. CRUSE    3,477,688
FLUID LINE COUPLING
Filed Oct. 31, 1966

INVENTOR
LEE H. CRUSE
BY
ATTORNEY 3,477,688
FLUID LINE COUPLING
Lee H. Cruse, Springfield, Mo., assignor to Foster Manufacturing Co., Inc., Springfield, Mo., a corporation of Missouri
Filed Oct. 31, 1966, Ser. No. 590,721
Int. Cl. F16l 29/00, 37/28
U.S. Cl. 251—149.9            12 Claims

ABSTRACT OF THE DISCLOSURE

This invention is directed to a fluid line coupling of the quick-connect variety, with the latching sleeve and valve sleeve biased apart by a spring disposed between the two sleeves.

---

This invention relates to fluid line couplings and more particularly, to a quick-connect hose coupling provided with valve means.

Broadly speaking, the present invention resides in a female hose or fluid line coupling of the quick-connect variety, the coupling comprising a body portion adapted to receive a conventional male hose coupler element and having two axially aligned sleeves mounted on the external surface thereof. The forward or latching sleeve actuates the latching mechanism which engages the male coupler element, while the rear or valve sleeve forms part of the valve means for blocking the flow of fluid through the female coupling. The valve sleeve is provided with a bayonet slot which receives a radially projecting pin located on the body so that the valve sleeve can be optionally locked in an open position wherein it will endwise abut against the forward or latching sleeve and thereby prevent the latter from moving to the unlocked or disengaged position with respect to the male coupler. Interposed between the latching and valve sleeves is a spring which biases the latching sleeve toward the forward or engaged position and further urges the valve sleeve to and maintains it in the closed position when it is not positively locked in the open position.

It is often desirable, as a matter of safety, to vent high pressure pneumatic or other fluid hoses to the atmosphere when they are connected or disconnected so that no pressure differential exists across the separable male and female coupling elements at which the connection or disconnection occurs. The forces generated by a pressure differential across partially joined coupling elements could propel one of the elements against a nearby object or individual and cause considerable damage or injury. To overcome this hazard, a few couplings of current manufacture incorporate manually operable valves into the structure thereof for blocking the air line immediately prior to the actual connecting means embodied therein so that no pressure differential exists at the juncture of the two separable coupler elements. Such a valve precludes any loss of fluid during coupling or uncoupling and therefore such couplings posses a distant advantage over the so-called self-sealing variety. Furthermore, such couplings permit one to optionally close or block the fluid line even when the coupling elements are connected. One of the more sophisticated types of manually operable valved hose couplings is the so-called dual sleeve variety in which the female coupling comprises a body having two axially aligned sleeves mounted on the external surface thereof. One of the sleeves actuates the latching mechanism which engages the male coupler, while the other sleeve is, in effect, part of the valve. Moreover, the sleeves are located on the body so that the latching sleeve when moved to the disengaged or cocked position with respect to the male coupler element will abut against the valve sleeve and move it into a closed position, if, in fact, it is not already in the closed position. Such a coupling is described and illustrated in U.S. Patent 3,179,149.

The so-called dual sleeve valved couplings of current manufacture, while being an improvement over previous valved couplings, nevertheless possess certain disadvantages. No satisfactory locking means is provided for holding the valve sleeve in the open position so that it cannot be unauthorizedly moved to the closed position when such sleeve is snagged or otherwise caught on a protrusion or other object as the hose and coupling are dragged across a floor or work bench. Moreover, such couplings are often complicated and require a time consuming complete disassembly to replace O-rings and other replaceable components subject to wear. Furthermore, although often it is desirable to hold the valve closed even when the female coupling is connected to the male coupler, no means are provided on current couplings for maintaining the valve sleeve in a closed position under such conditions.

Among the several objects of the present invention may be noted the provision of a valved hose coupling having valve and latching sleeves and means for simultaneously and positively holding such sleeves in the open and engaged positions, respectively; the provision of a valved hose coupling of the type stated wherein the valve sleeve will automatically return to the closed position when not positively held in the open position; the provision of a valved hose coupling in which the components subject to wear can easily be replaced with a minimum amount of disasssembly; the provision of a hose coupling of the type stated in which the valve sleeve is positively held in the closed position when the latching sleeve is in the disengaged position; and the provision of a hose coupling which is simple and rugged in construction, durable in performance, and easy to manufacture. Other objects and features will be in part apparent and in part pointed out hereinafter.

In the accompanying drawings, in which one of various possible embodiments of the invention is illustrated, FIG. 1 is an elevational view of a coupling constructed in accordance with and embodying the present invention, the coupling being aligned for reception of a mating coupler element;

Corresponding reference characters indicate corresponding parts throughout the several views of the drawings.

Figure 1:
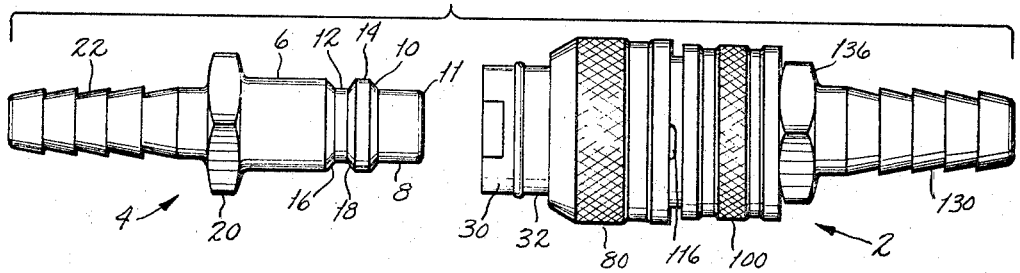

Referring now in more detail and by reference characters to the drawings which illustrate a preferred embodiment of the present invention, 2 designates a female hose coupling which is adapted to receive a conventional male coupler 4. Inasmuch as the latter is conventional in design and construction, it is sufficient for purposes of the present disclosure to note that it includes a tubular stem 6 which is turned down at one end in the provision of a diametrally reduced nipple 8 which, in turn, inwardly terminates at a chamfered annular shoulder 10 and outwardly terminates at an arcuate or somewhat rounded end face 11. Inwardly from shoulder 10 stem 6 is further turned down in the formation of an annular locking groove 12 and an annular ridge 14, the latter being located intermediate nipple 8 and groove 12. The sides of groove 12 are defined by outwardly diverging beveled faces 16, 18. At its other end stem 6 terminates at an enlarged hexagonal portion 20 which integrally merges into an axially extending fluted shank 22, shank 22 being tapered slightly for insertion in the end of a conventional pneumatic hose, all as best seen in FIG. 1.

Figure 2:
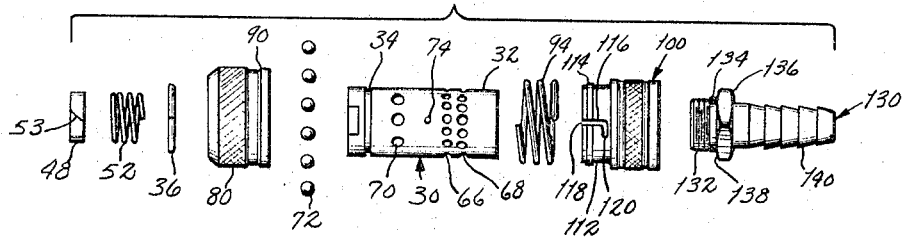
FIG. 2 is an exploded elevational view of the coupling.

Female coupling 2 includes a body 30 having a substantially unobstructed cylindrical outer surface 32 which is turned down at its forward end, which is the left end as seen in FIG. 2, in the provision of an annular groove 34 for snap-fitting reception of a split locking ring 36 formed preferably of spring wire. From its forward end body 30 is relieved in the formation of a forward bore 38 which is sized for slidable reception of stem 6 of male coupler 4 and is further flared outwardly at its forward end in the formation of a short bell-mouth 40. Near its inner end, bore 38 is diametrally enlarged in the provision of an enlarged annular recess 42, the ends of which are defined by front and rear shoulders 44, 46, respectively. Slidably mounted within annular recess 42 is a retainer sleeve 48 having an inclined forward face 50 which projects radially inwardly into bore 38. Retainer sleeve 48 is preferably formed from a lightweight synthetic resin and is biased toward front shoulder 44 by means of a retainer spring 52 which is interposed between sleeve 48 and rear shoulder 46. Spring 52 is diametrally reduced by any suitable means such as a tubular compression member and then passed through forward bore 38 and into recess 42 where it expands to its normal diametral size. To facilitate instalaltion, retainer sleeve 48 is provided with a diagonal slit 53 cut at approximately 9° to the axial centerline thereof. During installation the ends of sleeve 48 located by slit 53 are overlapped slightly thereby reducing the diameter of sleeve 48 so that it can be passed through bore 38. When sleeve 48 reaches annular recess 42 it will spring back into its original circular configuration.

Inwardly from rear shoulder 46 body 30 is provided with an internal annular groove 54 into which an elastomeric O-ring 56 of substantially circular cross-sectional shape is fitted, the inner margins of O-ring 56 being disposed radially inwardly from rear shoulder 46. Beyond O-ring 56, bore 38 opens into a diametrally reduced coaxial terminal bore 58, the end of which is defined by an imperforate intermediate wall 60 formed integral with body 30.

From its opopsite end body 30 is also relieved in the formation of a partially threaded rear bore 62 located coaxially with respect to bores 38, 58, bore 62 also inwardly terminating at intermediate wall 60. At its outer or rear end bore 62 is somewhat enlarged in the provision of an annular recess 64. On each side of and in close proximity to wall 60, body 30 is provided with a plurality of circumferentially spaced radial ports 66, 68, which establish communication between the exterior of body 30 and terminal bore 58 and rear bore 62, respectively. Similarly, in the vicinity of front shoulder 44 of recess 42, body 30 is provided with a plurality of circumferentially spaced radial bores 70 which are located so that retainer sleeve 48 will at least partially cover such bores when biased into engagement with front shoulder 44 by spring 52. Fitted into bores 70 are retainer balls 72 the diameter of which are equal and somewhat greater than the axial length of bores 70, that is, the diameter of each ball 72 is greater than the radial distance between the internal surface defining bore 38 and external cylindrical surface 32. The inner ends of bores 70 are diametrally reduced slightly so that balls 72 will not fall into forward bore 38 when sleeve 48 is retracted. In the vicinity of annular recess 42 immediately forward from rear shoulder 46, body 30 is snugly fitted with a rigid pin 74 which projects radially beyond cylindrical surface 32.

Figure 4:
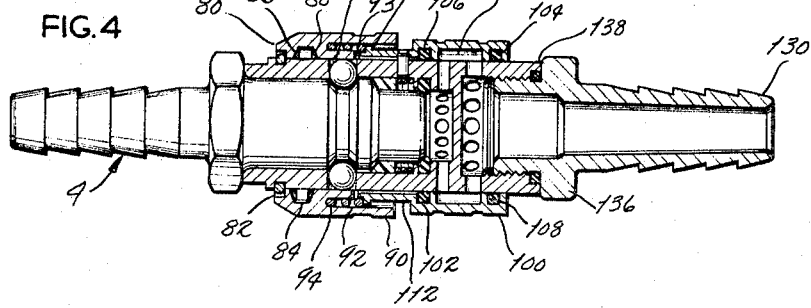
FIG. 4 is a sectional view of the coupling in retentive engagement with the mating coupler element with the valve sleeve in the open position.

Slidably mounted on the forward portion of body 30 for axial movement on cylindrical surface 32 is a latching sleeve 80 which is counterbored from its forward end to provide an annular recess 82 adapted to seat around and clear locking ring 36, locking ring 36 being adapted to engage the radial or shoulder-forming surface of recess 82 and thereby limit the forward movement of sleeve 80 on body 30. Rearwardly from recess 82, sleeve 80 is provided with an internal annular clearance groove 84 having front and rear tapered surfaces 86, 88. In this connection it should be noted that groove 84, when in the proper axial position, accommodates the outer segments of retainer balls 72 so that such balls do not project into bore 38. From its rear end latching sleeve 80 is counterbored to form a diametrally enlarged skirt 90 and an axially extending trepanned groove 92, the latter of which rearwardly terminates at an abutment shoulder 93, all as best seen in FIG. 4. Fitted within groove 92 and completely shielded from the exterior of coupling 2 by means of skirt 90 is a helical spring 94 which, when completely compressed, is housed entirely within trepanned groove 92. Forwardly from shoulder 93, sleeve 80 is provided with an axially extending cylindrical covering surface 96 which snugly but slidably engages cylindrical surface 32 of body 30 and moreover covers bores 70 when sleeve 80 engages locking ring 36, as best seen in FIG. 4.

Figure 3:
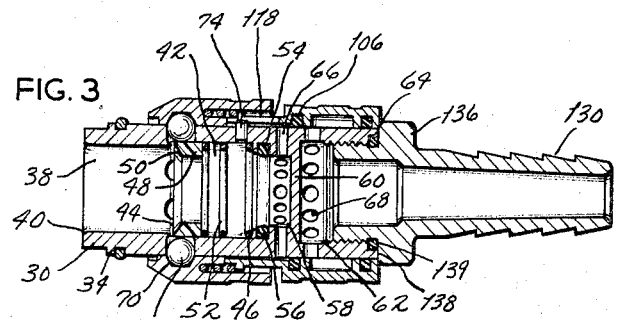
FIG. 3 is a sectional view of the coupling showing the latching sleeve in the cocked position and the valve sleeve in the closed position.

Slidably mounted on the rear portion of body 30 is a valve sleeve 100 having front and rear internal annular grooves 102, 104 into which O-rings 106, 108, respectively, are fitted for providing a fluid-tight seal between the interior of sleeve 100 and cylindrical surface 32. Intermediate O-rings 106, 108 valve sleeve 100 is internally relieved in the formation of internal annular channel 110 having sufficient axial width to encircle both ends of ports 66, 68, at the same time to establish a communicating passage therebetween. At its forward end, valve sleeve 100 is provided with a forwardly projecting cylindrical nose portion 112 which is located in slightly outwardly spaced relation to cylindrical surface 32, but nevertheless fits within skirt 90 of latching sleeve 80. Slightly inwardly from its forward end nose portion 112 is provided with a radially projecting lip 114 which engages the rear end of spring 94 completely within the confines of skirt 90 so that latching sleeve 80 and valve sleeve 100 are biased away from one another. Nose portion 112 is further provided with a bayonet slot 116 which accepts pin 74, the slot 116 including an axial section 118 and an adjoining circumferential section 120. It is important to note that when pin 74 engages circumferential section 120 as illustrated in FIG. 4, annular channel 110 will encircle both sets of ports 66, 68, thereby permitting communication between the two. However, when pin 74 is disposed within the forward end of axial section 118, as best seen in FIG. 3, O-ring 106 will embrace that portion of cylindrical surface 32 located intermediate ports 66, 68, thereby precluding communication between the two. In the latter position, the forward end of nose portion 112 will be located in close proximity to abutment shoulder 93 of latching sleeve 80. Moreover, the lengths of valve sleeve 100 and latching sleeve 80 are such that when clearance groove 84 of the latter registers with bores 70, sleeve 100 will be prevented from moving axially forward on body 30 by abutment shoulder 93 of latching sleeve 80.

Threaded into rear bore 62 is a tubular fitting 130 including a threaded end portion 132 which engages the threads of bore 62 but does not cover ports 68. End portion 132 inwardly terminates at a groove 134 located adjacent an enlarged hexagonal portion 136 which projects beyond cylindrical surface 132 in the formation of a shoulder 138 adapted to engage the rear face of valve sleeve 100 and thereby limit the rearward movement of such sleeve. When sleeve 100 does abut against shoulder 138, O-ring 108 will embrace body 30 intermediate ports 66, 68.

Fitted within groove 134 is an elastomeric O-ring 139 which is compressed into sealingwise engagement with the walls of annular recess 64 surrounding bore 62 so as to form a fluid-tight seal between body 30 and fitting 130. Enlarged hexagonal portion 136 integrally merges into a fluted shank 140 which tapers slightly for insertion into a conventional air hose. It should be understood, of course, that fitting 130, and for that matter, male coupler 4, can be integrally provided with any of the numerous conventional fastening means currently available for securing hoses and other fluid conduits to such fittings in lieu of shanks 140, 22.

When female coupling 2 is disengaged from male coupler 4 latching sleeve 80 of the former will be in a so-called cocked position wherein clearance groove 84 overlies radial bores 70 and retainer sleeve 48 is at the forward end of annular recess 42 against forward shoulder 44 so that the outer surface of retainer sleeve 48 at least partially blocks bores 70, all as best seen in FIG. 3. This causes retainer balls 72 to project outwardly beyond cylindrical surface 32 and into groove 84. Spring 94 urges latching sleeve 80 forwardly, but movement is prevented by balls 72 which engage rear tapered surface 88 of groove 84. When latching sleeve 80 is presented in the cocked position, valve sleeve 100 must necessarily be in its closed position wherein it abuts shoulder 138 of fitting 130. When cocked, latching sleeve 80 will be disposed somewhat rearwardly from locking ring 36 and inasmuch as abutment shoulder 93 is presented opposite the forward end of valve sleeve 100, valve sleeve 100 will also be presented rearwardly on body 30. The axial dimensions of the various components of coupling 2 are such that only a slight clearance space exists between the forward face of nose portion 112 and abutment shoulder 93 of latching sleeve 80 when latching sleeve 80 is cocked thereby precluding axial movement of valve sleeve 100. When valve sleeve 100 abuts shoulder 138 of fitting 130, annular channel 110 overlies only ports 68 or, in other words, O-ring is interposed between ports 66, 68, so as to preclude communication therebetween and prevent fluid escaping from coupling 2. Furthermore, abutment shoulder 93 of latching sleeve 80 will prevent valve 100 from moving forwardly into an open position. It is also significant to note that when latching sleeve 80 is in the cocked position, spring 94 will be housed almost entirely within trepanned groove 92 and pin 74 will be presented within the forwardmost end of longitudinal section 118 of bayonet slot 116.

To couple male coupler 4 and female coupling 2, stem 6 of the former is inserted into forward bore 38 of the latter. Inasmuch as nipple 8 is of a somewhat reduced diameter, it will pass through retainer sleeve 48 allowing chamfered annular shoulder 10 to engage inclined forward face 50 of retainer sleeve 48. Further advancement of male coupler 4 pushes retainer sleeve 48 rearwardly against the bias of retainer spring 52, causing sleeve 48 to withdraw from covering relation with respect to radial bores 70. When annular ridge 14 on stem 6 passes beyond bores 70, spring 94 will urge latching sleeve 80 forward, causing rear tapered surface 88 of clearance groove 84 to cam retainer balls 72 radially inwardly beyond the external cylindrical surface 32 of body 30 so that a segment of each of such retainer balls 72 projects into annular locking groove 12 on stem 6. Latching sleeve 80 will advance until its forward end engages locking ring 36, in which position cylindrical covering surface 96 will be disposed in overlying relation to bores 70, precluding outward radial movement of retainer balls 72, which, in turn, firmly secures balls 72 within locking groove 12 so as to prevent withdrawal or further advancement of male coupler 4, all as best seen in FIG. 4. Moreover, when stem 6 is locked within bore 38 as previously described, rounded end face 11 of nipple 8 engages and slightly compresses O-ring 56 so as to form a fluid-tight seal therewith. Although the forward disposition of latching sleeve 80 enables spring 94 to expand outwardly from trepanned groove 92, it still remains in engagement with lip 114 and continues to urge valve sleeve 100 into abutment with shoulder 138 of fitting 130. Nevertheless the forward end of nose portion 112 of valve sleeve 100 is now disposed considerably to the rear of abutment shoulder 93 located on latching sleeve 80 and accordingly valve sleeve 100 is free for axial forward movement on body 30 against the bias of spring 94.

As previously noted, when valve sleeve 100 is moved forward to a point where pin 74 aligns with circumferential section 120 of bayonet slot 116, annular channel 110 will overlie both sets of ports 66, 68, and establish communication therebetween. Thus, the pressurized fluid will flow through fitting 130 into rear bore 62 from which it will exit adjacent wall 60 through ports 68 which discharge it into annular channel 110. Inasmuch as channel 110 also overlies ports 66 the pressurized fluid will pass into ports 66 and thence into terminal bore 58 from which it is discharged into stem 6 of male coupler 4.

To positively lock valve sleeve 100 in the open position, it is merely rotated slightly with respect to body 30 so as to bring locking pin 74 into engagement with circumferential section 120 bayonet slot 116. When valve sleeve 100 is locked in such open position a substantial portion of nose portion 112 will again be encircled by skirt 90 and the forward margin of the former will again be presented in close proximity to abutment shoulder 93 of latching sleeve 80. Thus, latching sleeve 80 cannot be moved rearwardly on body 30 to its cocked or disengaged position and male coupler 4 cannot be withdrawn from forward bore 38 as long as male coupler 4 is subjected to elevated pressures.

To detach male coupler 4 from female coupling 2, valve sleeve 100 must first be rotated with respect to body 30 until locking pin 74 aligns with longitudinal section 118 of bayonet slot 116. At this point, spring 94 will urge valve sleeve 100 rearwardly until it abuts against shoulder 138 of fitting 130, in which position O-ring 108 will be interposed between radial ports 66, 68, so as to preclude communication therebetween. Moreover, nose portion 112 of valve sleeve 100 will overlie ports 66 in slightly outwardly spaced relation thereto so that any pressurized fluid entrapped downstream from intermediate wall 60 will escape. In other words, when valve sleeve 100 is in the closed position, terminal bore 58 and the interior of tubular male coupler 4 are vented to the atmosphere through radial ports 66. Accordingly, no pressure differential will exist at the juncture of female coupling 2 and male coupler 4 within forward bore 38 when male coupler 4 is detached. Latching sleeve 80 is next moved rearwardly on body 30 and when clearance groove 84 comes into registration with radial bores 70 retainer spring 52 will move retainer sleeve 48 forwardly. Sleeve 48, in turn, will bear against chamfered shoulder 10 of stem 6 urging male coupler 4 partially out of forward bore 38. Simultaneously, beveled face 18 of locking groove 12 will cam balls 72 outwardly within radial bores 70 until a segment of each ball 72 protrudes somewhat beyond cylindrical surface 32, thereby blocking forward movement of latching sleeve 80. Balls 72 will subsequently ride up onto annular ridge 14 of stem 6 and thereafter retainer sleeve 48 will again move into covering relation with respect to bores 70 so as to preclude inward movement of balls 72, thereby again placing latching sleeve 80 in the cocked position. At this point male coupler 4 will slide freely out of forward bore 38.

From the foregoing, it is readily apparent that male coupler 4 cannot be detached from female coupling 2 while the former is subjected to elevated pressures and accordingly workmen need not fear such couplings or be concerned with one element being propelled across a floor or workbench and injuring a nearby individual or damaging property. Moreover, female coupling 2 includes means for positively locking valve sleeve 100 in the open position so that even if it does become momentarily snagged on some object as it is drawn across a floor or workbench, valve sleeve 100 will not move to the closed or a partially closed position but will continue to remain in the open position. However, when not in the locked position, valve sleeve 100 will be biased against fitting 130 in a closure-forming relation with respect to ports 68. Similarly, when latching sleeve 80 is cocked, valve sleeve 100 is positively held in the closed position; and fluid cannot escape from the system through coupling 2 when male coupler 4 is detached therefrom.

Inasmuch as retainer sleeve 48 is formed from a lightweight synthetic resin material, it will not be subjected to inertial forces of sufficient magnitude to overcome the bias of spring 52 when female coupling 2 is heavily jarred or subjected to a severe axially directed mechanical shock. This prevents latching sleeve 80 from unauthorizedly moving from a cocked to an uncocked or forward position when coupling 2 is subjected to such jars or shocks.

Finally, it is important to note that, although elastomeric O-rings 106, 108 will in time wear out and permit fluid to escape, they can be quickly replaced merely by unscrewing fitting 130 and thereafter withdrawing valve sleeve 100 from body 30 to gain access to the interior of the sleeve.

In view of the above, it will be seen that the several objects of the invention are achieved and other advantageous results attained.

As various changes could be made in the above constructions without departing from the scope of the invention, it is intended that all matter contained in the above description or shown in the accompanying drawings shall be interpreted as illustrative and not in a limiting sense.

What is claimed is:

1. A quick-connect fluid line coupling for receptive engagement with a mating coupler element; said coupling comprising a body provided with a forward bore adapted to receive said mating coupler element; latching means carried by said body for retentively engaging said mating coupler element, said latching means being adapted to move from a cocked position wherein said latching means awaits reception of said male coupler element to a latched position wherein said latching means holds said mating coupler element within said forward bore; valve means on said body for interrupting the flow of fluid to said forward bore, said valve means including a valve element adapted to move from a closed position wherein fluid is prevented from entering said forward bore to an open position wherein fluid flows into said forward bore; and spring means between said latching means and said valve element for urging them towards their latched and closed positions respectively.

2. A coupler element according to claim 1 wherein a retained means is within said forward bore, said retainer means being adapted to move rearwardly within said forward bore from a first position holding said latching means against movement in its cocked position to a second position releasing said latching means.

3. A coupling according to claim 2 in which said retainer means comprises a plurality of radial bores formed in said body and opening into said forward bore, retainer balls slidably fitted within said bores, said retainer balls being greater in diameter than the axial length of said radial bores, a retainer sleeve slidably mounted within said forward bore for axial movement from a retracted position wherein it is disposed to the rear of said radial bores so that said retainer balls will extend into said forward bore for engagement with said mating coupler element to an extended position wherein it engages said retainer balls and urges them outwardly so that a segment of each ball protrudes beyond the outer surface of said body, and means for biasing said retainer sleeve to said extended position.

4. A coupler element according to claim 2 in which the retainer means is engaged and held in the second position by the mating coupler element when it is inserted in the forward bore and spring means yieldably urge the retainer means into the first position when the mating coupler is removed from the forward bore.

5. A coupling according to claim 3 in which the forward bore is diametrally enlarged intermediate the radial bores and imperforate wall in the provision of an enlarged annular recess for slidably accommodating and endwise limiting the axial displacement of the retainer sleeve, the retainer sleeve being slit so that the ends formed by the slit can be overlapped to reduce the transverse dimension of the sleeve, whereby the sleeve can be inserted through the bore into the diametrally enlarged recess.

6. A coupling according to claim 1 and further characterized by locking means for locking the valve element in the open position.

7. A coupling according to claim 1 in which the body is further provided with a rear bore, an imperforate wall located intermediate the forward and rear bores, forward ports which establish communication between the forward bore and outer surface of the body, and rear ports which establish communication between the rear bore and outer surface of the body; and in which the valve element is a valve sleeve which encircles the body for slidable movement thereon, the sleeve having an internal channel which overlies the forward and rear ports when the valve element is in the open position whereby to establish communication between the forward and rear bores.

8. A coupling according to claim 7 and further characterized by locking means for locking the valve sleeve in the open position.

9. A coupling according to claim 7 in which the latching means includes a latching sleeve encircling the body for sliding movement thereon, the latching sleeve being in endwise abutment with the valve sleeve when the latching sleeve is in the first position whereby to preclude movement of the valve sleeve from the closed position.

10. A coupling according to claim 7 in which the first ports are vented to the atmposphere when the valve sleeve is in the closed position.

11. A coupling according to claim 10 and further characterized by a pin rigidly secured to and projecting outwardly from the body; and in which the valve sleeve is provided with a bayonet slot for slidable reception of the pin, the bayonet slot having an axial section and a circumferential section, the pin being capable of engaging the circumferential section only when the valve sleeve is in the open position, whereby the valve sleeve is free for axial shifting movement when the pin is in the axial section and is locked in the open position when the pin is in the circumferential section.

12. A coupling according to claim 11 in which th pin is located on the body intermediate the forward ports and latching means and in which the valve sleeve includes a forward nose portion disposed in slightly outwardly spaced encircling relation to the body, the nose portion overlying the first ports when the valve sleeve is in the closed position whereby pressurized fluid can escape from the forward bore when the valve sleeve is in the closed position.

References Cited

UNITED STATES PATENTS

| | | | |
|---|---|---|---|
| 2,248,701 | 7/1941 | Fowler | 251—89.5 |
| 3,127,149 | 3/1964 | Cruse | 251—149.9 |
| 3,140,072 | 7/1964 | Sciuto | 251—89.5 |
| 3,404,705 | 10/1968 | Zopf et al. | 251—149.9 X |

ARNOLD ROSENTHAL, Primary Examiner

PO-1050
(5/69)

UNITED STATES PATENT OFFICE
CERTIFICATE OF CORRECTION

Patent No. 3,477,688                    Dated November 11, 1969

Inventor(s) Lee H. Cruse

It is certified that error appears in the above-identified patent and that said Letters Patent are hereby corrected as shown below:

Column 1, line 56, "posses" should read -- possess --; same line, "distant" should read -- distinct --. Column 2, line 2, "3,179,149" should read -- 3,127,149 --; line 29, "disascembly" should read -- disassembly --. Column 3, line 26, "instalaltion" should read -- installation --; line 43, "opopsite" should read -- opposite --. Column 5, line 32, "O-ring is" should read -- O-ring 108 is --. Column 6, line 17, "120 bayonet" should read -- 120 of bayonet --. Column 7, line 48, "retained" should read -- retainer --. Column 8, line 53, "th" should read -- the --.

SIGNED AND
SEALED
MAY 12 1970

(SEAL)
Attest:

Edward M. Fletcher, Jr.
Attesting Officer

WILLIAM E. SCHUYLER, JR.
Commissioner of Patents